United States Patent [19]

Teague

[11] Patent Number: 5,073,989

[45] Date of Patent: Dec. 24, 1991

[54] HEADBAND CONSTRUCTION

[75] Inventor: Tara G. Teague, Waltham, Mass.

[73] Assignee: The Leather Shop, West Concord, Mass.

[21] Appl. No.: 416,411

[22] Filed: Oct. 3, 1989

[51] Int. Cl.$^5$ ............................................... A42C 5/00
[52] U.S. Cl. .......................................... 2/181; 2/338; 2/DIG. 11
[58] Field of Search ........ 2/181, 181.2, 338, DIG. 11; 87/2-8; 24/265 A, 129 W, 115 A; 63/2, 11; 132/273, 275

[56] References Cited

U.S. PATENT DOCUMENTS

| D. 87,731 | 9/1932 | Silverman et al. | D2/635 |
| 193,337 | 7/1877 | Leonard | 24/265 A |
| 330,586 | 11/1885 | Heisler | 87/8 |
| 536,965 | 4/1895 | Neuberger | 24/265 A |
| 2,063,299 | 10/1935 | Clinch, Sr. | 87/3 |
| 4,738,006 | 4/1988 | Juarez | 24/115 A |
| 4,742,581 | 5/1988 | Rosenthal | 2/181 |

FOREIGN PATENT DOCUMENTS 0161388  4/1921  United Kingdom ............. 24/115 A

OTHER PUBLICATIONS

Avon.Fashions, Summer 1986, p. 65.
Specification Sheet, Leather Shop, Inc., for Leather Belts, 5/27/87.

Primary Examiner—William A. Cuchlinski, Jr.
Assistant Examiner—D. DePumpo
Attorney, Agent, or Firm—Wolf, Greenfield & Sacks

[57] ABSTRACT

A headband construction is provided which is formed from an elongated material section and an elongated elastic section having a cross section generally smaller than that of the material section. A pair of clips are provided which secure each end of the material section to a corresponding end of the elastic section. The clips have inwardly facing grippers such as pointed teeth at each end thereof and may for example be crimped to secure the sections together. Preferably, a cover is provided for each clip which cover is held in place at least in part by the corresponding clip. For the preferred embodiment, the covering is a cord which is secured at at least one end in the clip means and is wrapped therearound. For preferred embodiments the material section is formed of a plurality of elongated strands of material which are interconnected by wrapping, braiding or twisting.

19 Claims, 2 Drawing Sheets

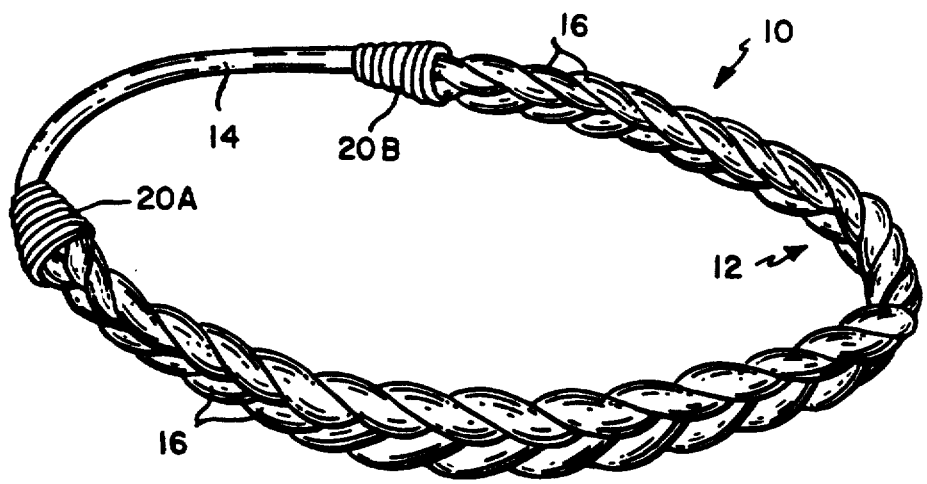
FIG. 1
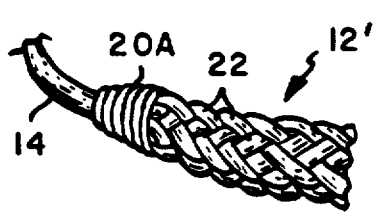
FIG. 2
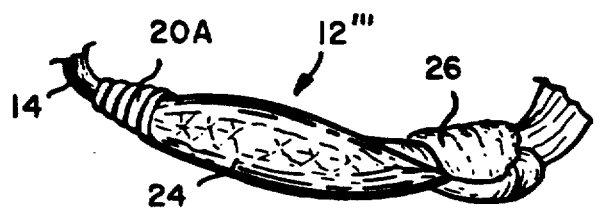
FIG. 3
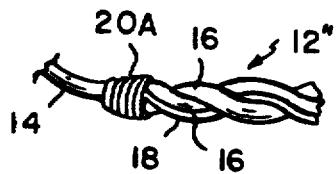
FIG. 2A
FIG. 4

HEADBAND CONSTRUCTION

FIELD OF THE INVENTION

This invention relates to headbands adapted to be worn in hair primarily for decorative purposes and to methods for the construction of such headbands.

BACKGROUND OF THE INVENTION

While there are many headbands on the market which people, particularly women, can wear, primarily for aesthetic purposes, there is always a demand for such a band which provides a new and more aesthetically pleasing effect. In addition to pleasing aesthetics, women also want such headbands to be well constructed so that the aesthetics are enhanced by clean lines and the band maintains its shape and appearance and does not come apart in use over an extended period of time. These features should not be achieved at the expense of user comfort, as is the case for many existing bands which utilize a wire or plastic core with memory to hold the band in place. This method of securing the band detracts from wearer comfort by either pressing on the wearer's temples or being too loose to remain in place. All of these features should be available in a headband which is easily fabricated and thereby can be made and sold at a relatively inexpensive price.

It is therefore an object of this invention to provide a new and improved headband construction which is relatively simple and inexpensive to fabricate while providing a clean aesthetically pleasing appearance, being comfortable to wear and being sturdy so as to maintain shape and appearance over an extended time period.

SUMMARY OF THE INVENTION

In accordance with the above, this invention provides a headband construction which is formed from an elongated material section of predetermined cross section and an elongated elastic section having a cross section which is generally smaller than the cross section of the material section. A pair of clip means are provided with each securing one end of the material section to a corresponding end of the elastic section. Each clip means has inwardly facing gripping means, for example inwardly facing pointed projections, at each end thereof which projections grip the adjacent material sections and elastic sections when the clip means is engaged, for example crimped, to secure the two sections therein. A means may also be provided for covering each of the clip means, and such covering means may be held in place at least in part by the clip means. For the preferred embodiment, the covering means is a cord which is secured at least one end in the clip means and is wrapped therearound. For preferred embodiments, the material section is formed of a plurality of elongated strands of material which are interconnected by wrapping, braiding, twisting, knotting or other suitable means.

The foregoing and other objects, features and advantages of the invention will be apparent from the following more particular description of preferred embodiments of the invention as illustrated in the accompanying drawings.

IN THE DRAWINGS

FIGS. 1, 2, 2A and 3 are perspective views of various embodiments of the invention.

FIG. 4 is a perspective view of a woman wearing a headband of the type shown in FIG. 1.

DETAILED DESCRIPTION

Figure 5:
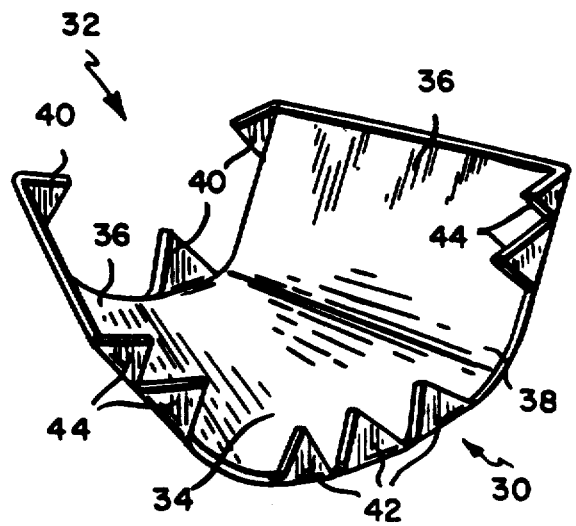
FIG. 5 is a perspective view of a clip of the type used to secure together two sections of a headband in accordance with preferred embodiments of the invention.

FIG. 1 illustrates a first embodiment of the invention wherein the headband 10 has a material section 12 and an elastic section 14. Material section 12 is formed of three elongated strands of material 16 which are braided together. For the embodiment shown in FIG. 1, the three strands 16 are of tubular fabric (i.e., fabric which is turned inside out, stuffed and stitched). The junctions between the material section 12 and the elastic section 14 are formed in a manner to be discussed shortly and are wrapped with a cord 20.

The material for the various strands 16 may vary substantially in color, texture and other factors to achieve desired aesthetic effects. In some applications, the various strands 16 may all be identical, while in other applications one or more of such strands may be of a contrasting color, of a different type or texture of material or may otherwise provide a contrasting aesthetic appearance. For example, one or more strands may be of cord, beads or the like. Material section 12 would typically be substantially nonelastic and, for preferred embodiments, approximately fifteen to twenty inches long for adult models. Children's models would be shorter.

Elastic section 14 is formed of a piece of standard tubular elastic material which, for preferred embodiments is approximately ⅛ths inch in diameter and approximately four to five inches long. The elastic section 14 is preferably constructed so as to minimize any tendency of the elastic to pull apart or unravel once subjected to stress. Elastic 14 could be of any desired color and would typically be of a color which is aesthetically compatible with the color or colors of material section 12.

Cords 20 are relatively thin, having a diameter for a preferred embodiment of approximately ⅛th inch, and are of a color and texture which matches or contrasts in an aesthetically pleasing fashion with the material of material section 12. Each cord 20 would be wound tightly on a junction, with each cord wrap laid abutting the adjacent wrap so as to avoid gaps between wraps, thereby providing a clean aesthetically pleasing junction.

FIG. 2 illustrates an alternative embodiment of the invention wherein the material section 12' is formed of a plurality of relatively thin strands or cords 22 rather than the tubular fabric strands 16. The flat braided strands 22, for example 4 or 6 such strands, may be of fabric, cord, leather, plastic, or other suitable material and may all be of the same color and texture or one or more of the strands 22 may be of a contrasting color and/or texture to provide a desired aesthetic effect.

While all strands in FIG. 2 are shown of the same size or width, the strands may be of different sizes or widths.

FIG. 2A illustrates another embodiment of the invention wherein the material section 12" is formed of two tubular fabric strands 16, which are countertwisted (i.e., each strand is twisted as the strands are twisted together) with a smaller diameter cord 18. The cord 18 could, for example, be the same as the cord 20. For some embodiments, the cord 18 may be eliminated.

FIG. 3 shows still another embodiment of the invention wherein the material section 12''' is formed of a single piece of material 24. A knot 26 may be provided at a point for example midway along the material 24. For other embodiments, the knot may be replaced by a bow, jewelry component, bead, shell or other decorative element. Two or more decorative elements may be used on a fabric section for any of the embodiments, and such elements may be the same or different.

FIG. 4 illustrates the manner in which headbands in accordance with this invention may be worn with the material portion 12 being on top of the head and being visible, while elastic section 14 is on the lower back of the head and is normally covered by the wearer's hair. The exact location of the band on the user's head will vary with user preference and hairstyle. Elastic section 14 makes the size of the band easily adjustable to comfortably fit individuals having large variations in head size. The wrapped joints and generally soft, unconstructed (soft core) configuration of the material section and the elastic section also avoid pressure on the wearer's temples and any sharp edges which could cause discomfort to the user while the elastic assures that the headband will stay in place. A headband with enhanced comfort and wearability is thus provided.

FIG. 5 shows a clip 30 of a type which may be utilized to secure together material section 12 and elastic section 14 for any of the various embodiments of the invention. The clip has a tapered wall 32 which is formed with a center section 34 and two side sections 36, each of which is at an obtuse angle to section 34 at a junction 38. A single pointed projection or tooth 40 extends inwardly at substantially a right angle from the smaller tapered end of each of the sections 34 and 36. Three pointed teeth 42 extend inwardly at substantially a right angle from center section 34 and two teeth 44 extend inwardly at substantially a right angle from each of the sections 36 at the larger ends thereof.

Figure 6:
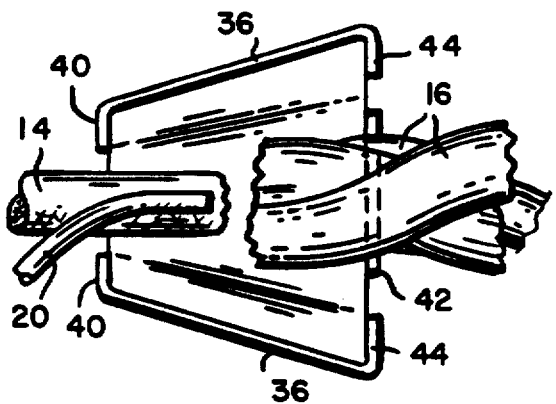
FIG. 6 is a side view illustrating the first step in the formation of a section joint in accordance with a preferred embodiment of the invention.

Referring to FIG. 6, the first step in the construction of a headband 10 is to lay one end of elastic section 14 in the smaller tapered end of clip 30 and to lay one end of material section 12 in the larger end of the clip. One end of cord 20 is also laid in the smaller end of clip 30. The end of elastic section 14 is preferably wrapped with tape 48 to prevent the elastic section from unraveling.

The next step in the operation is for the clip to be crimped using a suitable tool, such as a pair of long nosed pliers if done manually or a suitable crimping machine if done automatically. This causes teeth 40 to dig into elastic section 14 and causes teeth 42 and 44 to dig into material section 12 to hold these sections in the clip and thus to hold the sections together. Walls 34 and 36 may also press against sections 12 and 14 to provide further frictional engagement. Cord 20 is also held in the clip either by teeth 40 or by frictional engagement. The appearance of the joint after crimping is shown in FIG. 8.

Figure 8:
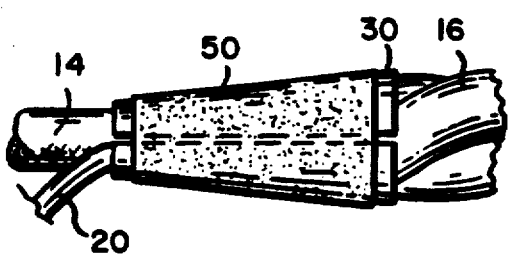
FIGS. 8 and 9 are side views of the section joint shown in FIG. 6 or FIG. 7 at an advanced step in the formation of the joint and after the joint has been completed respectively.
Figure 9:
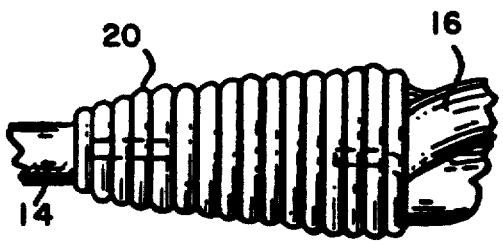

In addition, in FIG. 8, a layer of two-sided tape 50 is shown wrapped around the crimped clip 30. During the next step in the operation, cord 20 is wrapped around clip 30, the adhesive of two-sided tape 50 holding the wraps of cord 20 so that they do not unravel either during assembly or thereafter. As previously indicated, the wraps of cord 20 are laid with adjacent wraps abutting so that there is no space between adjacent wraps. When the wrap operation has been completed, the free end of wrap 20 is forced into clip 30 either manually or preferably by use of a suitable tool, such as an awl, and is frictionally engaged in the clip. The completed joint is shown in FIG. 9.

Figure 7:
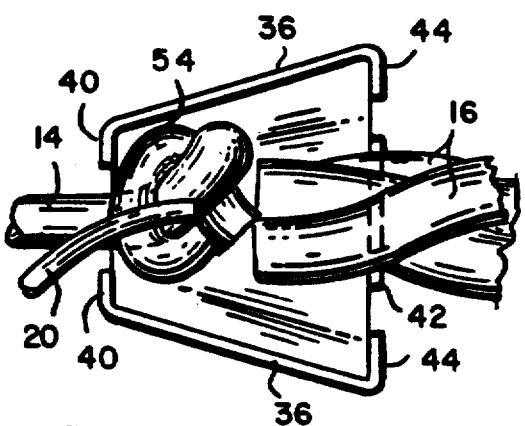
FIG. 7 is a side view of the same stage in joint formation as that shown in FIG. 6 for an alternative embodiment of the invention.

FIG. 7 illustrates an alternative embodiment for the joint wherein a knot 54 is formed in the end of elastic section 14. Knot 54 serves as a strain relief so that teeth 40 do not cause a tearing or unraveling of the elastic when the elastic is stretched. While tape 48 is shown in FIG. 7, it is generally not required to prevent unraveling when knot 54 is formed. Knot 54 also provides a more secure joint, assuring that elastic section 14 is not pulled from the joint in use.

While the invention has been shown and described above with respect to a number of embodiments, it is apparent that the material of section 12 may assume other configurations than the three configurations shown while still remaining within the invention. Thus, rather than having strands 16 and cord 18 twisted, a cord 18 or a strand 16 could be a core with other strands and/or cords wrapped thereon. Similar modifications may also be made in the elastic section and in the nature and formation of the joints between the two sections. For example, teeth 40, 42 and 44 may be replaced with an inwardly facing flange, particularly where a knot 54 is provided, at least one end of the clip or by other suitable gripper elements. In some applications, particularly where there is a knot 54, the taper in clip 32 may not be required. If clip 32 is formed of a decorative metal, wrapping cords 20 may also be eliminated for low-cost embodiments. Further, decorative tape, material, or other suitable wrapping for clips 32 might be utilized in place of cords 20. Thus, while the invention has been particularly shown and described with reference to preferred embodiments, the foregoing and other changes in form and detail may be made therein by one skilled in the art while still remaining within the spirit and scope of the invention.

What is claimed is:

1. A headband comprising:
   an elongated unconstructed material section having first and second ends and a predetermined cross-section;
   a one piece elongated elastic section having first and second ends and a cross-section which is smaller than the cross-section of the material section;
   first and second clip means securing together the first and second ends respectively of said material section and said elastic section, each of said clip means being sized and shaped at one end to receive and hold one end of said material section and being sized and shaped at the other end to receive and hold one end of said elastic section; and
   cord means wrapped around and secured to said clip means to form a covering therefor.

2. A headband as claimed in claim 1 wherein said material section is formed of a plurality of elongated strands of material which are interconnected in a predetermined way.

3. A headband as claimed in claim 2 wherein said strands are braided together.

4. A headband as claimed in claim 2 wherein said strands are countertwisted together.

5. A headband as claimed in claim 2 wherein said strands are all of the same material.

6. A headband as claimed in claim 2 wherein at least two of said strands are of different material.

7. A headband as claimed in claim 2 wherein all of said strands have the same cross-section.

8. A headband as claimed in claim 2 wherein at least two of said strands have different cross sections.

9. A headband as claimed in claim 2 wherein at least one of said strands is of a tubular fabric.

10. A headband as claimed in claim 1 wherein said clip means each have tapered walls which are adapted to be crimped to said sections.

11. A headband as claimed in claim 10 wherein said gripping means are pointed projections extending inwardly from said tapered walls, said projections digging into said sections to secure the sections when the clip means are crimped.

12. A headband as claimed in claim 9 including a knot formed at each end of said elastic section, said gripping means interacting at least in part with the corresponding knot when said clip means is crimped to secure the corresponding elastic section end in the clip means.

13. A headband as claimed in claim 1 wherein said material section is formed of a single elongated piece of material.

14. A headband as claimed in claim 13 including at least one decorative element on said piece of material between its ends.

15. A headband as claimed in claim 14 wherein said piece of material has a knot formed therein at a point between the ends.

16. A headband as claimed in claim 1 including at least one decorative element on said material section.

17. A headband as claimed in claim 1 wherein said elastic section has a generally circular cross-section.

18. A method of fabricating a headband comprising the steps of:
(a) fitting one end of an elongated material section having a predetermined cross-section and one end of an elongated elastic section having a cross-section with a smaller area than the material section cross-section in a clip;
(b) fitting one end of a first cord means in said clip;
(c) crimping said clip to secure the material section, the elastic section and the cord means therein;
(d) wrapping said cord means around said clip means and securing the other end of the cord means in the clip; and
(e) repeating steps (a) through (d) above for the opposite ends of said material section and said elastic section, utilizing a second cord means.

19. A method as claimed in claim 18 including the step performed prior to step (a) of forming a knot in the end of the elastic section.

* * * * *